(12) United States Patent
Mullaney, Jr.

(10) Patent No.: US 7,704,387 B2
(45) Date of Patent: Apr. 27, 2010

(54) FRYER FILTRATION ARRANGEMENT

(75) Inventor: Alfred E. Mullaney, Jr., Baltimore, MD (US)

(73) Assignee: Illinois Tool Works Inc., Glenview, IL (US)

( * ) Notice: Subject to any disclaimer, the term of this patent is extended or adjusted under 35 U.S.C. 154(b) by 210 days.

(21) Appl. No.: 11/941,801

(22) Filed: Nov. 16, 2007

(65) Prior Publication Data

US 2008/0060528 A1    Mar. 13, 2008

Related U.S. Application Data

(63) Continuation of application No. 10/991,629, filed on Nov. 18, 2004, now Pat. No. 7,309,422, which is a continuation-in-part of application No. 10/421,098, filed on Apr. 23, 2003, now Pat. No. 6,890,428, which is a continuation of application No. 09/760,356, filed on Jan. 12, 2001, now Pat. No. 6,572,764.

(51) Int. Cl.
*A47J 37/12* (2006.01)

(52) U.S. Cl. .............. 210/167.28; 210/175; 210/416.1; 210/DIG. 8; 99/330

(58) Field of Classification Search ............ 210/167.01, 210/167.27, 175, 194, 196, 416.1, 416.5, 210/DIG. 8, 167.28; 99/330, 403, 408
See application file for complete search history.

(56) References Cited

U.S. PATENT DOCUMENTS

| | | | |
|---|---|---|---|
| 445,223 A | 1/1891 | Knight | |
| 2,359,368 A | 10/1944 | Klopfenstein | |
| 2,424,211 A | 7/1947 | Webb | |
| 2,578,129 A | 12/1951 | Daugherty | |
| 2,610,740 A | 9/1952 | Hunter | |
| 2,635,527 A | 4/1953 | Overbeck et al. | |
| 2,760,641 A | 8/1956 | Mies, Jr. et al. | |
| 2,914,063 A | 11/1959 | Wagner | |
| 3,045,827 A | 7/1962 | Hough | |
| 3,147,220 A | 9/1964 | Avery | |
| 3,159,095 A | 12/1964 | Wagner | |
| 3,210,193 A | 10/1965 | Martin | |
| 3,263,818 A | 8/1966 | Gedrich | |
| 3,279,605 A | 10/1966 | Shepherd | |
| 3,280,722 A * | 10/1966 | Rahauser | 99/332 |
| 3,410,199 A | 11/1968 | Quednau | |
| 3,477,361 A | 11/1969 | Bradshaw | |
| 3,483,981 A | 12/1969 | Gordon | |
| 3,608,472 A | 9/1971 | Pelster et al. | |
| 3,613,550 A * | 10/1971 | Thompson | 99/330 |
| 3,667,374 A | 6/1972 | Holmes | |

(Continued)

FOREIGN PATENT DOCUMENTS

DE    2746728    4/1979

(Continued)

OTHER PUBLICATIONS

Installation, Operation and Care of Models MF50 and MF85 Mobile Filters, Instructions, Vulcan-Hart Company, 1998, pp. 1-12.

(Continued)

*Primary Examiner*—Fred Prince
(74) *Attorney, Agent, or Firm*—McGuireWoods LLP

(57) ABSTRACT

A fryer filtration arrangement utilizes certain automated components.

9 Claims, 8 Drawing Sheets

U.S. PATENT DOCUMENTS

| | | | |
|---|---|---|---|
| 3,685,433 A | 8/1972 | Cunningham | |
| 3,701,313 A | 10/1972 | Boggs | |
| 3,735,871 A | 5/1973 | Bisko | |
| 3,797,378 A | 3/1974 | Morris | |
| 3,894,482 A | 7/1975 | Murphy | |
| 3,973,481 A | 8/1976 | Mies | |
| 3,977,973 A | 8/1976 | Anderson | |
| 4,084,492 A | 4/1978 | Sullivan | |
| 4,113,623 A | 9/1978 | Koether et al. | |
| 4,328,097 A | 5/1982 | Whaley et al. | |
| 4,420,006 A | 12/1983 | Moore et al. | |
| 4,444,095 A | 4/1984 | Anetsberger et al. | |
| 4,487,691 A | 12/1984 | Panora | |
| 4,591,434 A | 5/1986 | Prudhomme | |
| 4,604,203 A | 8/1986 | Kyle | |
| 4,607,857 A | 8/1986 | LeSage et al. | |
| 4,623,544 A | 11/1986 | Highnote | |
| 4,747,944 A | 5/1988 | George | |
| 4,805,525 A | 2/1989 | Bivens | |
| 4,826,590 A | 5/1989 | Turman | |
| 4,890,548 A | 1/1990 | Grob et al. | |
| 4,895,137 A | 1/1990 | Jones et al. | |
| 4,899,649 A | 2/1990 | Grob et al. | |
| 4,945,893 A | 8/1990 | Manchester | |
| 4,959,144 A | 9/1990 | Bernard et al. | |
| 4,974,501 A | 12/1990 | Grob et al. | |
| 4,994,181 A | 2/1991 | Mullaney, Jr. | |
| 5,143,604 A | 9/1992 | Bernard et al. | |
| 5,247,876 A | 9/1993 | Wilson et al. | |
| 5,253,566 A | 10/1993 | McCabe et al. | |
| 5,261,322 A | 11/1993 | Yokoyama et al. | |
| 5,297,474 A | 3/1994 | Tabuchi | |
| RE34,636 E | 6/1994 | Bivens | |
| 5,404,799 A | 4/1995 | Bivens | |
| 5,449,469 A | 9/1995 | Burklund et al. | |
| 5,458,772 A | 10/1995 | Eskes et al. | |
| 5,486,370 A | 1/1996 | Bivens | |
| 5,577,438 A | 11/1996 | Amitrano et al. | |
| 5,582,093 A | 12/1996 | Amitrano et al. | |
| 5,595,107 A | 1/1997 | Bivens | |
| 5,597,601 A | 1/1997 | Griffin | |
| 5,680,811 A | 10/1997 | Highnote et al. | |
| 5,709,899 A | 1/1998 | Bivens | |
| 5,731,024 A | 3/1998 | Bivens | |
| 5,743,175 A | 4/1998 | Crain et al. | |
| 5,776,530 A * | 7/1998 | Davis et al. | 426/233 |
| 5,870,945 A | 2/1999 | Bivens | |
| 5,973,297 A * | 10/1999 | Winter et al. | 219/441 |
| 6,009,794 A * | 1/2000 | Casey et al. | 99/330 |
| 6,095,037 A | 8/2000 | Savage et al. | |
| 6,235,210 B1 | 5/2001 | Saksena | |
| 6,269,808 B1 | 8/2001 | Murahashi | |
| 6,306,294 B1 | 10/2001 | Blair | |
| 6,378,420 B1 | 4/2002 | Savage et al. | |
| 6,470,794 B2 | 10/2002 | Takahashi | |
| 6,572,764 B2 | 6/2003 | Mullaney | |

FOREIGN PATENT DOCUMENTS

| | | |
|---|---|---|
| EP | 0649622 | 4/1995 |
| GB | 2 307 650 | 6/1997 |
| JP | 8-150083 A * | 6/1996 |
| JP | 2001-327414 | 11/2001 |

OTHER PUBLICATIONS

Installation and Operation Manual, 47 Series Gas Fryers, Frymaster L.L.C., Nov. 1998.

Specification Sheet for Filter System for High Efficiency Fryers, Vulcan-Hart Corporation (Nov. 1986).

Operating, Installation, Service & Parts Manual for High Efficiency Fryer Filtermate, Vulcan-Hart Corporation (Jan. 1986).

"Magnum Retrofit Kit Eliminates Filter Paper," Date: 1996, 2 pages.

"840546 Magnum Filter Leaf Kit—Fry Master Footprint II (C×C)," Date: Feb. 1999, 4 pages.

"Kitchen Equipment, Frymaster Filter," Date: Apr. 1999, 1 page.

CIPO Requisition Report of Canadian App. No. 2,516,376, prepared Aug. 27, 2009.

* cited by examiner

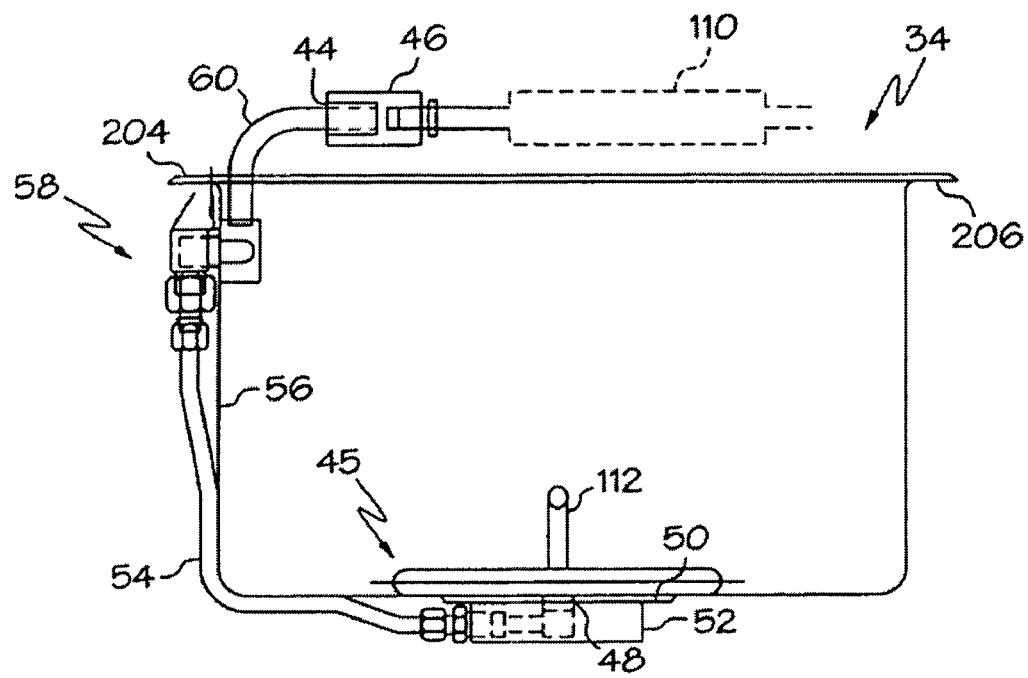
FIG. 2
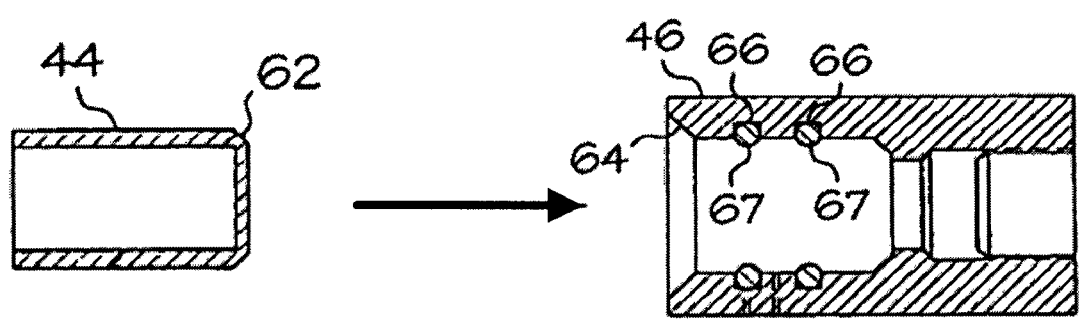
FIG. 3
FIG. 4

US 7,704,387 B2

FRYER FILTRATION ARRANGEMENT

CROSS-REFERENCE TO RELATED APPLICATIONS

This application is a continuation of application Ser. No. 10/991,629, filed Nov. 18, 2004, which issued as U.S. Pat. No. 7,309,422, which is a continuation-in-part of application Ser. No. 10/421,098, filed Apr. 23, 2003, which issued as U.S. Pat. No. 6,890,428, which in turn is a continuation of application Ser. No. 09/760,356, filed Jan. 12, 2001, which issued as U.S. Pat. No. 6,572,764 each of which is expressly incorporated by reference in their entirety.

TECHNICAL FIELD

The present invention relates generally to deep-fat fryers and, more particularly, to a deep-fat fryer cooking oil filtration arrangement.

BACKGROUND

A typical deep-fat fryer will include a fryer vat containing a heating bath of cooking oil. The cooking oil is adapted to receive baskets of food products such that the food products will be immersed within and cooked by the heated cooking oil. Such fryers may also include a heat exchanger and a pump. The pump is responsible for continuously pumping the cooking oil from the fryer vat, through the heat exchanger and back into the fryer vat such that the cooking oil remains at a substantially constant temperature, thereby allowing the food products to be evenly and consistently cooked within the fryer vat. Fryers have also been manufactured with in vat fire tubes and associated burners, with combusted gases being passed therethrough to heat the oil, eliminating the need to constantly pump the oil from the vat through a heat exchanger.

To extend the useful life of the cooking oil, it is a common practice to filter the particulate food matter from the cooking oil to minimize the carbonization of such food matter within the cooking oil. Improvements in effectiveness and convenience of filtration systems are regularly sought.

SUMMARY

In one aspect, a fryer includes a flyer vat, a pan for receiving oil drained from the fryer vat, a filter assembly within the pan for filtering oil. An oil drain path leads from an outlet opening of the fryer vat to the pan, an automated drain valve is located along the oil drain path. An oil return path leads from the pan back to the fryer vat. A pump is located for delivering oil from the pan back along the oil return path to the fryer vat. A control unit is connected for controlling the automated valve and the pump. A user input device is associated with the control unit. Activation of the input device results in the control unit opening the automated valve and turning on the pump.

BRIEF DESCRIPTION OF THE DRAWINGS

FIG. 2 is a side elevation of the oil pan and associated filter assembly of the fryer of FIG. 1;

FIG. 3 is a cross-section of one embodiment of a return coupler which extends from the pan of FIG. 2;

FIG. 4 is a cross-section of one embodiment of a corresponding coupler which receives the coupler of FIG. 3;

DETAILED DESCRIPTION

Figure 1:
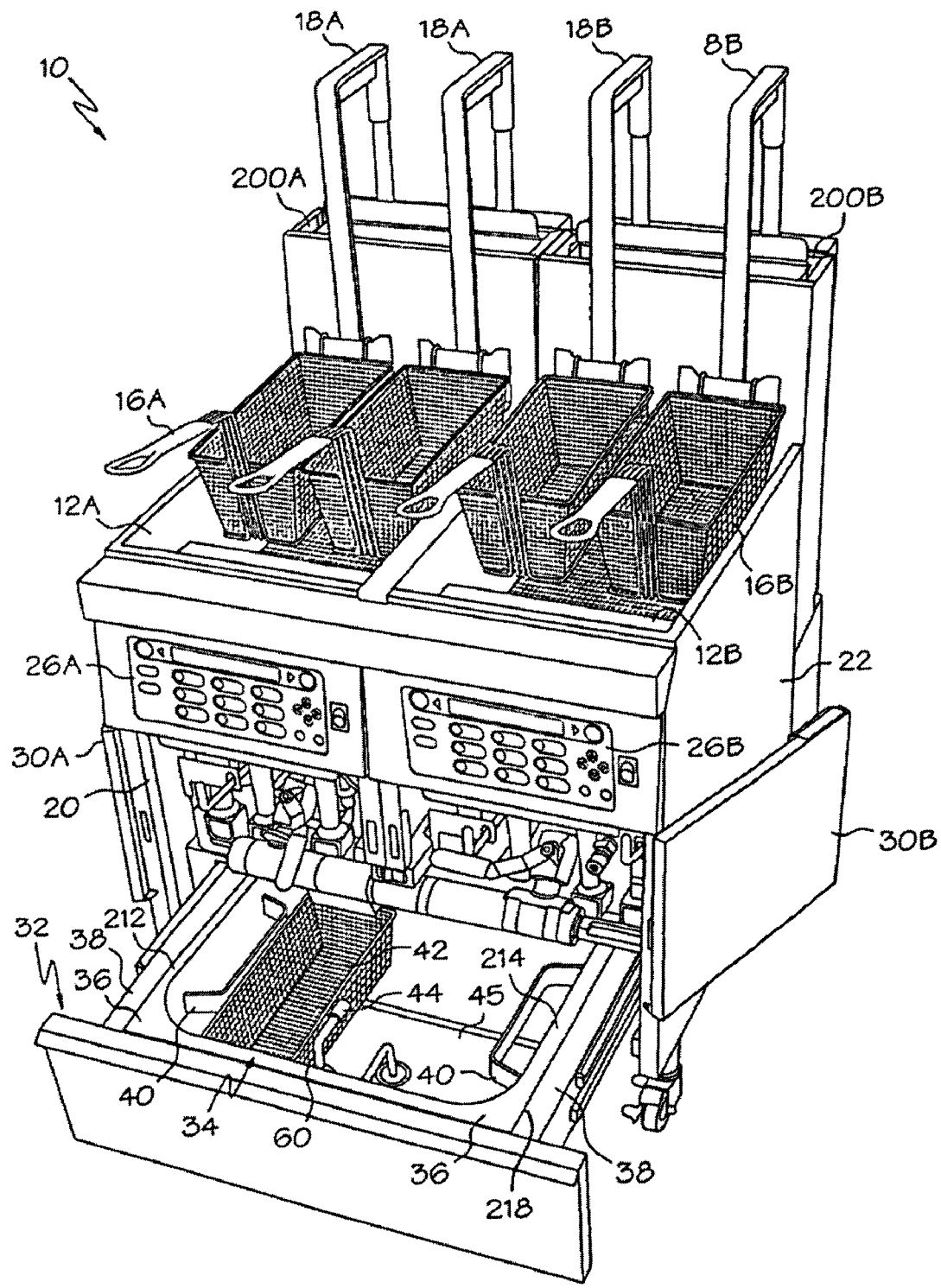
FIG. 1 is a front perspective of one embodiment of a fryer including a filtration arrangement.

Referring to drawing FIG. 1, a perspective view of a typical fryer 10 including two fryer vats 12A and 12B is shown. Each fryer vat includes at least one respective basket 16A and 16B which is automatically movable upward and downward via respective positioning guides 18A and 18B in a manner well known in the art. The fryer 10 includes a frame 20 which preferably includes associated housing 22 such as stainless steel. A front panel 24 of the fryer 10•includes a control and display panel 26A and 26B for each fryer vat. The lower portion of the housing frame includes a set of doors 30A, 30B which are movable between open and closed positions, and which are illustrated in the open position. Below the doors 30A, 30B a drawer 32 which is movable between open and closed positions relative to the frame 20 is provided, the drawer being illustrated in the open position. Positioned within the drawer 32 is an oil receiving pan 34 having a rim 36 which sits on rails 38 of the drawer 32. Handles 40 extend from the interior sidewalls of the pan 34 to allow the pan to be easily picked up and removed from the drawer to facilitate cleaning at a location away from the fryer 10. Positioning of the handles 40 on the inner portion of the pan helps facilitate simple positioning of the pan in the drawer 32. As used herein, the term "pan" is intended to broadly encompass any oil receiving container, unless otherwise specifically indicated.

A basket type screen 42 is removably positioned within the pan 34 for filtering out debris entering the pan 34 within oil which is drained from one of the fryer vats 12A and 12B. At the bottom of the pan 34 a filter assembly 45 is provided for filtering the oil. An oil return path from the pan 34 back to the fryer vat 12A, 12B is formed in part by a coupler 44 which is connected to and extends from a front sidewall of the pan 34. The illustrated coupler 44 extends rearwardly back toward the fryer frame 20. A corresponding coupler 46 (FIG. 2) is positioned on the fryer frame 20, with the two couplers aligned for slidingly mating with each other in a friction fit arrangement when the drawer 32 is moved to a closed position.

In the illustrated fryer 10, each vat 16A, 16B includes an associated exhaust stack 200A, 200B formed at the back of the fryer for venting combustion gases produced by the oil heating system which includes in vat fire tubes as will be described in more detail below with reference to FIGS. 8 and 9.

Referring now to FIG. 2, the pan 34 includes an outlet opening 48 through its bottom wall 50. The oil return path is formed in part by a flow passage through member 52 and piping 54 which runs along the external surface of bottom wall 50 and front wall 56 of the pan 34. The piping 54 may be placed against the surface of walls 50 and 56 as shown in order to provide good heat conduction between the pan 34 and the piping 54. In this manner, when the pan 34 is filled with hot oil as a tank 12A, 12B is drained, the hot oil imparts heat to the piping 54, through the pan 34, before flow through the piping 54 begins. Such heat delivery to the piping 54 aids in prevention of solidification of the oil as it travels through the piping 54, eliminating the need to use separate piping heating means such as thermal tape.

Near the top of front wall 56 a wall penetrating coupling assembly 58 passes through the wall 56, with piping 60 extending upward from the pan 34 and rearwardly as shown.

The end of piping 60 acts as the return coupler 44 and is shown in cross-section in FIG. 3. The return coupler 44 mates with corresponding coupler 46 which is shown in cross-section in FIG. 4. In the illustrated embodiment the return coupler 44 comprises a male coupler with a chamfer 62 at its end, and the corresponding coupler 46 comprises a female coupler which includes a chamfered opening 64 to facilitate sliding engagement with return coupler 44. The internal surface of coupler 46 includes two annular recesses 66 for receiving sealing members such as o-rings 67 which engage the outer surface of the return coupler 44 in a friction fit manner when the coupler 44 is inserted therewithin. The internal o-rings 67 thus remain unexposed and protected from damage when the drawer 32 is opened and the return coupler 44 is removed from coupler 46.

Figure 5:
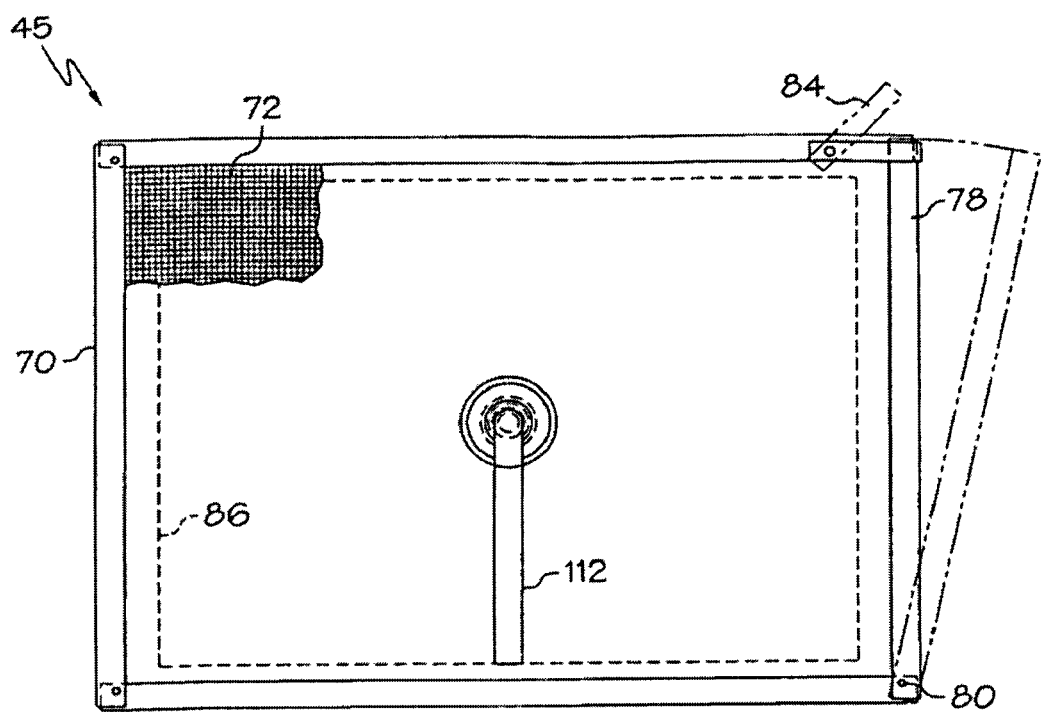
FIG. 5 is a top view of one embodiment of a filter assembly.
Figure 6:
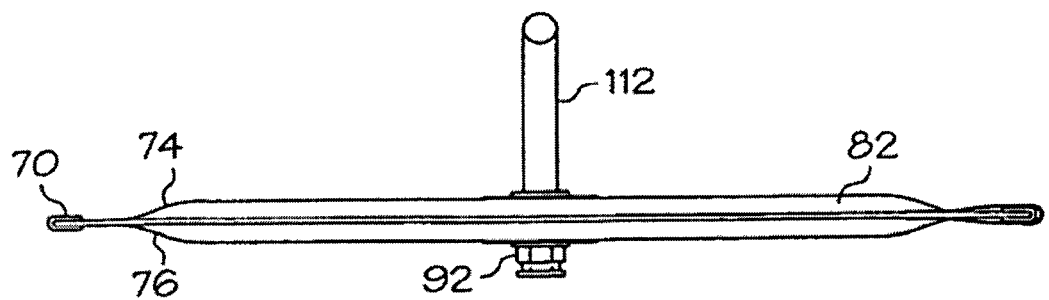
FIG. 6 is a side elevation of the filter assembly of FIG. 5.
Figure 7:
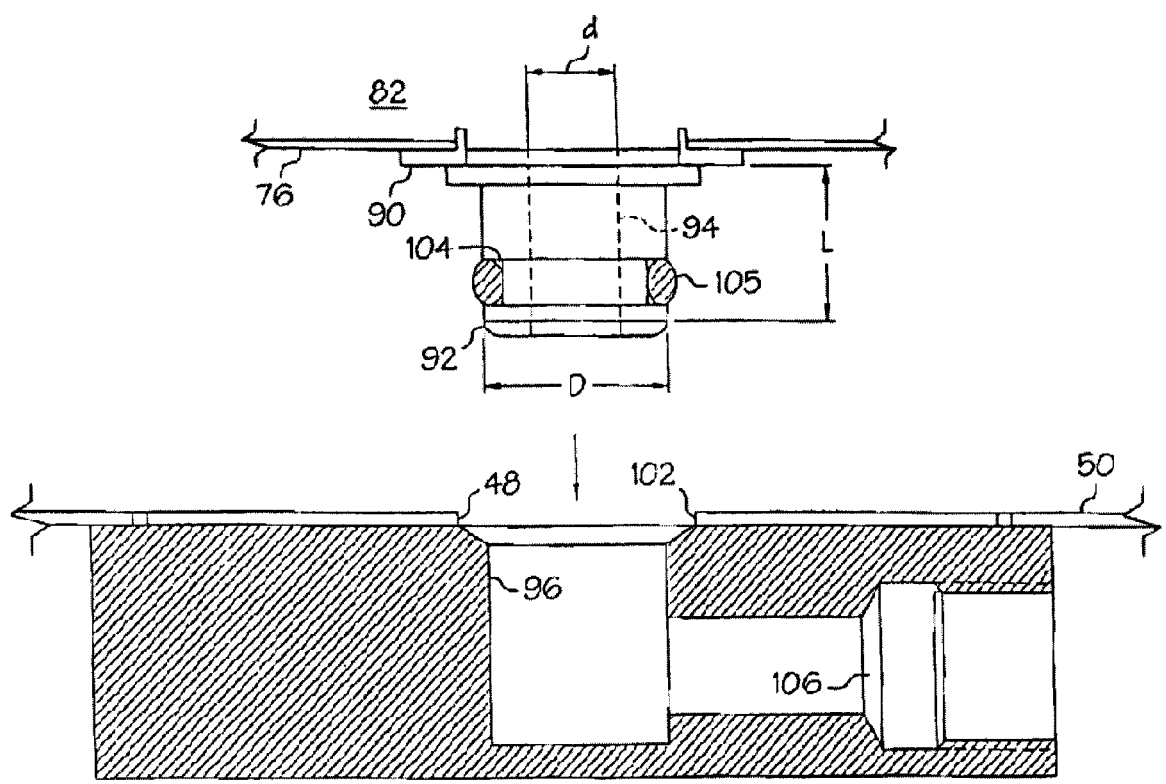
FIG. 7 illustrates one embodiment of a filter assembly and pan coupling arrangement.

One embodiment of a filter assembly 45 is shown in FIGS. 5 and 6. A rectangular metal frame 70 surrounds a stainless steel wire mesh or other filter screen material 72. The filter assembly is envelope-shaped and includes an upperside 74 and underside 76. While substantially the entire surface area formed by both the upperside 74 and underside 76 may be formed by the filter screen material, it is recognized that a lesser portion could be formed by the filter screen material. One side 78 of frame 70 is pivoted at corner 80 to permit movement between an open position (shown in shadow) and a closed position, with the open position providing access to an interior 82 of the assembly. Latch 84 holds frame portion 80 in the closed position when desired. Positioned within the interior 82 of the filter assembly is a removable spacer member 86 which may be in the form of a stainless steel wire-basket weave which allows oil to flow therethrough. The spacer member aids in holding the upperside 74 away from the underside 76 during operation. The underside 76 of the filter assembly includes an opening 88 therethrough which is surrounded by an annular flange 90, best seen in the partial exploded elevation/cross-section of FIG. 7. The upperside 74 of the filter assembly includes a similar opening and annular flange, not shown. The subject filter assembly in the above form, with an opening on its upperside and underside, is commercially available from Filter-All Inc. of Magnolia, Tex.

The subject commercially available filter is modified by connecting a coupler 92 having a flow passage 94 therethrough to the opening 88 on the underside 76, such as by welding to the flange 90. The passage 94 leads from the exterior of the filter assembly 45 to its interior 82. An L-shaped handle member 112 is connected to the opening and flange at the upperside 74 of the filter assembly 45 to seal off the upperside opening. The handle facilitates manual installation and removal of the filter assembly. The handle member 112 may be welded or otherwise connected to the upperside 74 of the filter assembly 45.

The coupler 92 is sized and shaped for mating with a coupler 96 which is defined by opening 48 in the bottom wall 50 of the pan 34. In the illustrated embodiment, the coupler 96 is formed in member 52 which may be welded or otherwise connected to the exterior surface of the bottom wall 50. The entry to coupler 96 may be chamfered at 102 to facilitate coupler 92 being slidingly inserted therein. Coupler 92 may include an annular recess 104 which receives a sealing member such as an o-ring 105 for engaging an inner surface of coupler 96. A friction fit, quick connect/disconnect arrangement is thereby provided. It is recognized that the o-ring could be located internally along the wall of coupler 96. In one embodiment the coupler 92 has a cylindrical outer shape and has an outer diameter D between about 0.720" and about 0.750", a length L between about 0.4" and about 0.6", and a through diameter d between about 0.350" and 0.400", with a preferred outer diameter of about 0.735", a preferred length of about 0.5", and a preferred through diameter of about 0.350". While the illustrated embodiment shows coupler 92 as a male coupler and coupler 96 as a female coupler, it is recognized that in other embodiments the coupler associated with filter assembly 45 could comprise a female coupler and that a male coupler could extend from the bottom wall 50 of the pan. Passage 106 is provided for leading to and coupling with piping 54 shown in FIG. 2.

Referring again to FIG. 2, the oil return path includes a pump 110 positioned therealong for drawing oil out of the pan 34. Oil traveling out of the pan 34 during a filtration operation travels from the pan 34, through the outer filter screen material 72 of the filter assembly 45, into the interior 82 of the filter assembly 45, and out of the interior 82 of the filter assembly 45 through a flow path defined by at least one of the couplers 92 and 96. Operation of the pump 110, and the associated flow of oil drawn out of the pan 34, creates a suction force for holding the coupler 92 of the filter assembly 45 to the coupler 96 of the pan 34, without requiring any latch or hold down member. The friction fit arrangement of o-ring 105 and inner surface of coupler 96 also aids in holding coupler 92 to coupler 96. The suction force created by the pump 110, and the associated flow of oil drawn out of the pan 34, also holds the return coupler 44 of the pan 34 to the corresponding coupler 46 of the fryer frame 20 so as to maintain the drawer 32 in a closed position during a filtration operation, without requiring any positive latch. The friction fit engagement of o-ring 67 with the outer surface of return coupler 44 also aids in holding return coupler 44 to corresponding coupler 46.

In one embodiment, when the couplers 92 and 96 are fully coupled at least part of the underside 76 of the filter assembly 45 is spaced from the bottom wall 50 of the pan 34 to enable oil to flow through both the upperside 74 and underside 76 of the filter assembly 45 as it is drawn out of the pan 34. This arrangement provides a greater oil filtering surface area as compared to systems in which the filter material, such as paper media, lies flat against the bottom wall 50 of the pan 34. Positioning pegs or posts may be provided on the bottom wall 50 of the pan 34 for such purpose, or could likewise extend from the underside 76 of the filter assembly 45. Channels could also be formed in the bottom wall 50 of the pan 34.

Figure 8:
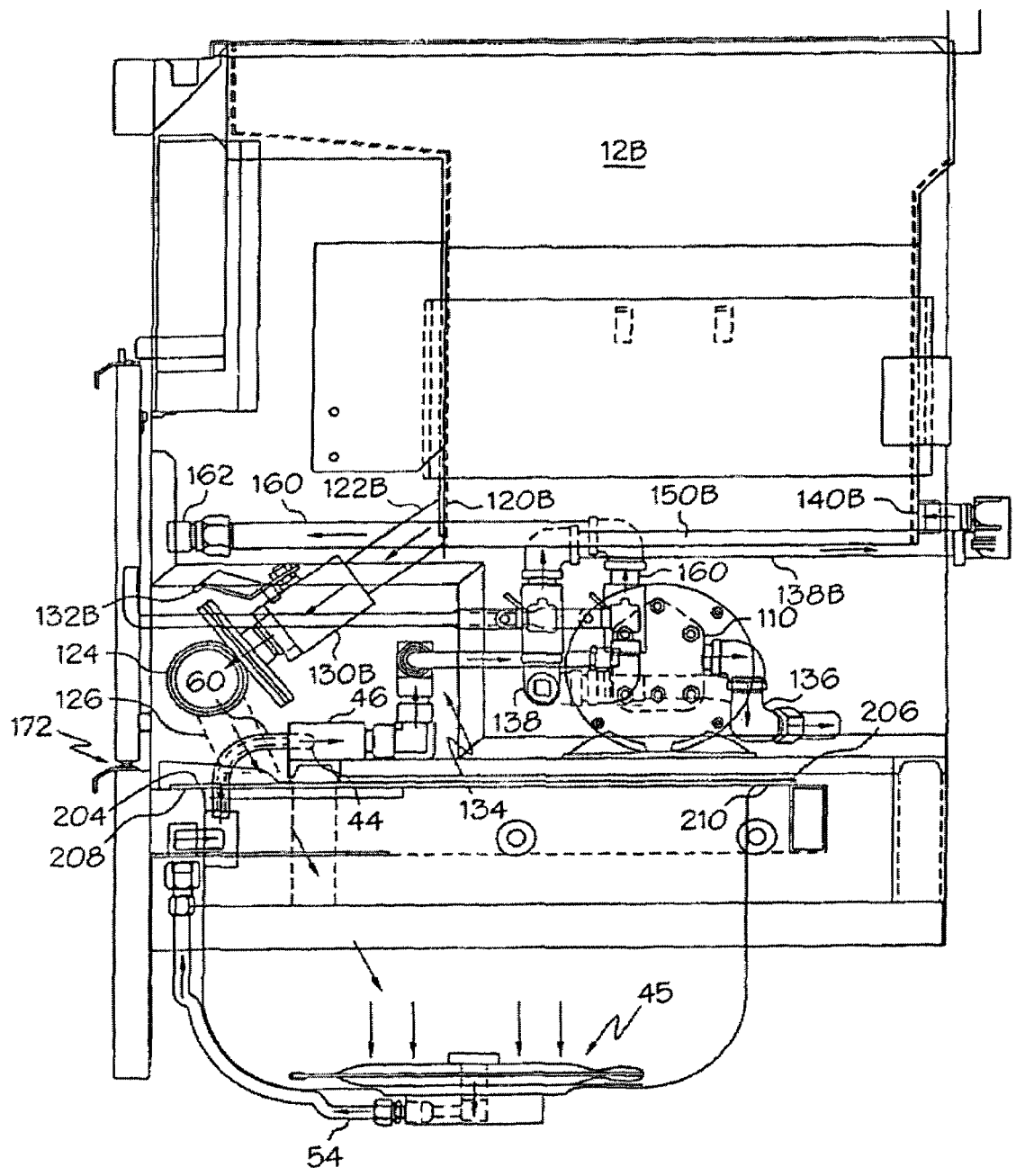
FIG. 8 is a schematic side elevation of the fryer of FIG. 1.
Figure 9:
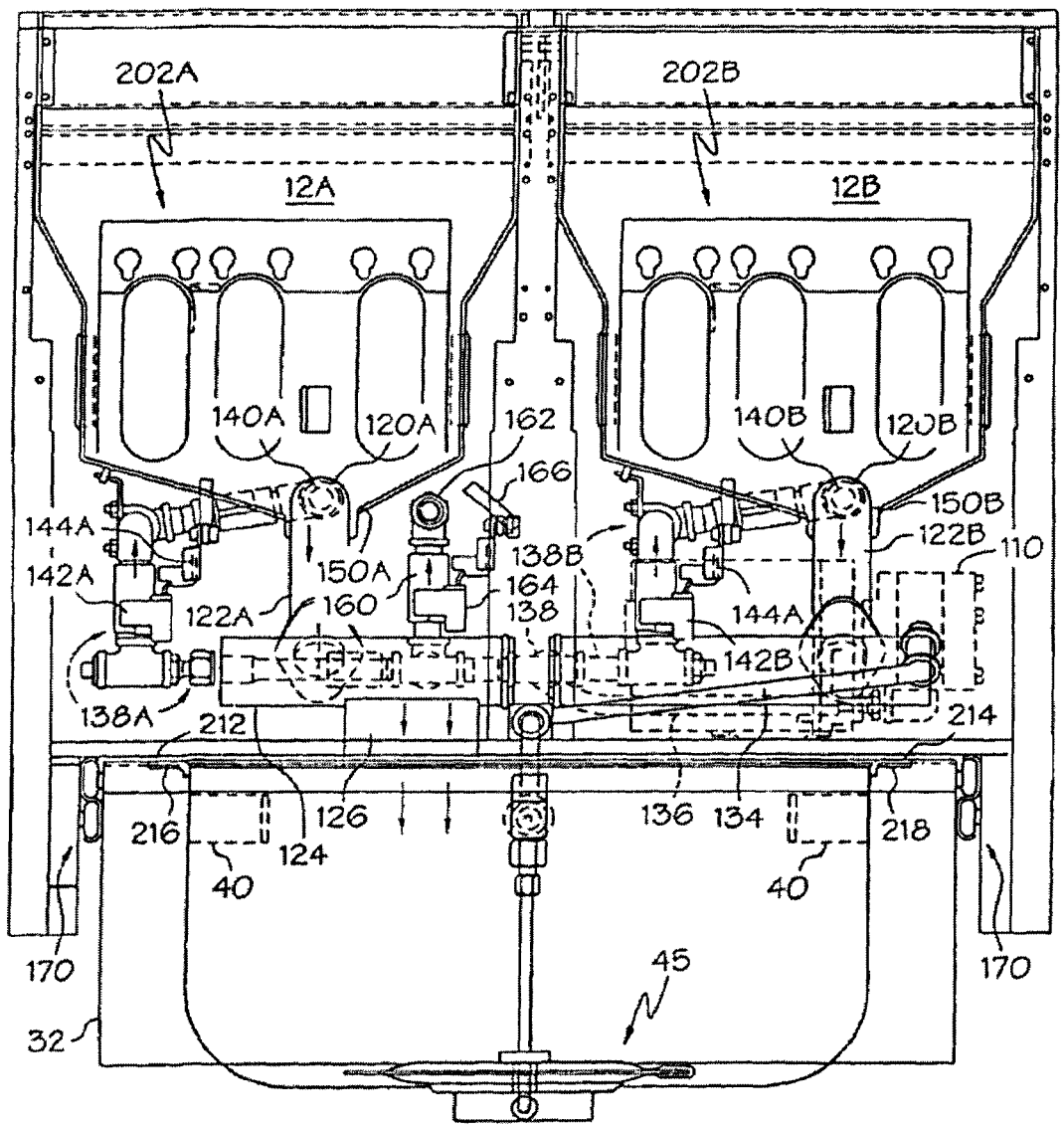
FIG. 9 is a schematic front elevation of the fryer of FIG. 1.

Referring now to drawing FIGS. 8 and 9, the fryer 10 including one embodiment of the subject fryer filtration arrangement is shown schematically in side and front elevation respectively. The fryer vat 12B is shown by two spaced, adjacent dashed lines in FIG. 8 and by two spaced, adjacent solid lines in FIG. 9. An outlet opening 120A, 120B in a wall of each vat 12A, 12B leads to a respective draining pipe 122A, 122B. The two draining pipes 122A, 122B lead to a common drain pipe 124 which extends laterally across a front portion of the fryer 10. The common drain pipe 124 includes an outlet 126 for delivering oil into the pan 34. Thus, each vat 12A, 12B includes a respective oil drain path extending from its outlet opening 120A, 120B to the pan 34. Positioned along each oil drain path is a flow control device 130B (seen only in FIG. 8) for controlling the draining of each vat. In particular, each flow control device may be a manually operable valve including a respective handle 132B for permitting a user to open and close the drain path as desired. Of course, other flow control devices may be used, including automatically controlled devices.

The oil return path from the pan 34 is formed in part by piping 54 and 60, return coupler 44 and corresponding coupler 46. Piping 134 leads from the coupler 46 to the pump 110. The outlet side of the pump 110 connects to piping 136 which extends to common piping 138. Common piping 138 includes segment 138A which, relative to the front view FIG. 9, runs to the left, upward, rearward and then to the right, to an inlet opening 140A in the vat 12A. Relative to the front view of FIG. 9, segment 138B runs to the right, upward, rearward and then to the right, to an inlet opening 140B in the vat 12B. Each segment 138A, 138B includes a respective flow control device 142A, 142B positioned therealong for controlling flow back to its respective vat 12A, 12B. The flow control devices may, for example, be manually operable valves including respective handles 144A, 144B for operation by a user.

By way of example, to filter the oil in vat 12B, the flow control device 130B is opened to permit oil to drain into the pan 34. The flow control device 142B is also opened to permit oil to be delivered back to the vat 12B. The pump 110 is then operated and oil is cycled from the pan 34, through the filter assembly 45, back along the oil return path through the pump 110 and to the vat 12B. During such operation the flow control devices 130A (not shown) and 142A are maintained in closed positions to prevent oil from draining from vat 12A and to prevent oil from being returned to vat 12A. When sufficient filtering has been achieved, the flow control device 130B is closed so that the vat 12B fills as oil is returned thereto by the pump 110. At the conclusion of the filtration operation the flow control device 142B is closed and the pump 110 is turned off.

Notably, a lower portion of each fryer vat 12A, 12B is shaped to direct particulate matter which settles in the fryer vat into a substantially linear region 150A, 150B along a bottom surface of the vat. In the illustrated embodiment this substantially linear settling is achieved using inclined bottom walls as best seen in the front view of FIG. 9. Each fryer vat inlet opening 140A, 140B is positioned at one end of the substantially linear region and each fryer vat outlet opening 120A, 120B is positioned at an opposite end of the substantially linear region for causing oil being circulated during a filtering operation to flow from the fryer vat inlet opening 140A, 140B, along the substantially linear region 150A, 150B, and out the fryer vat outlet opening 120A, 120B to push particulate matter lying in the substantially linear region toward and out of the fryer vat outlet opening 120A, 120B for delivery to the pan 34. In the illustrated embodiment, as best shown in FIG. 8 relative to vat 12B, each fryer vat 12B includes a front wall 152B and a back wall 154B, with the fryer vat inlet opening 140B formed in the back wall 154B, and the fryer vat outlet opening 120B formed in the front wall 152B. It is recognized that the relative positioning of the inlet and outlet openings on the front and back walls could be reversed, or that the openings could be formed in the sidewalls or bottom wall of the vat 12B. A channel could also be provided in the bottom of each vat to further define the substantially linear region of settling.

Also connected to common piping 138 is an oil dump path defined by piping 160. The piping 160 extends to a forward portion of the fryer frame 20 and includes a quick-disconnect coupling 162 at its end to facilitate connection of a hose which can be used to empty oil from the pan 34 into a separate container. A flow control device 164 is positioned along the oil dump path for controlling the flow of oil therealong. The flow control device 164 may, for example, be a manually operable valve including a handle 166 for operation by a user. In the illustrated embodiment, an oil dump is achieved by opening the flow control device 130A, 130B associated with the drain path of the vat to be dumped. The oil drains into the pan 34. The flow control device 164 is then opened and flow control devices 142A and 142B are maintained closed. When the pump 110 is operated, oil will be delivered to the piping 160 and out of the quick-disconnect coupling 162 when a hose is connected thereto.

Also shown in FIG. 8 is the fire tube assembly 202A, 202B of each vat. Each fire tube assembly includes at least one associated gas burner (not shown) for generating heat which passes along the fire tube(s) of its respective assembly 202A, 202B. The fire tubes are submerged in the oil, below the baskets 16A, 16B, to thereby heat the oil. Exhaust gases are vented via stacks 200A, 200B shown in FIG. 1. The filtering arrangement of the present invention is particularly useful in fryers having above-described heating arrangement, because the cooking oil is not continuously recirculated.

Referring to FIG. 9, the wheel and rail arrangement 170 of the drawer 32 is also shown. Front and back lips or flanges 204 and 206 which extend from the top of the pan 34 rest on pan supporting surfaces 208 and 210 which may be formed by drawer frame rails or struts. The pan 34 may also include left and right lips/flanges 212 and 214 best seen in FIG. 8, which rest on pan supporting surfaces 216 and 218 of the drawer 32. The lip/flange and support arrangement permits the pan 34 to be easily removed from drawer 32, using handles 40, without requiring manual disconnection of any components once the drawer 32 is opened. The pan 34 may be of stamped stainless steel construction. The side view of FIG. 8 shows aligned magnets 172 positioned at the front, top edge of the drawer and a front, lower edge of the fryer frame/housing for holding the drawer in the closed position during periods of non-filtration. No positive latching mechanism is required for the drawer.

Variations on the foregoing are possible. For example, while a fryer including two vats has been shown above in the illustrated embodiment, fryers including more or less vats could incorporate the subject filtration arrangement. Further, while the illustrated filter assembly is generally rectangular and envelope shaped, other filter assembly shapes could be used. While the filter assembly connects to the bottom wall of the pan, the outlet opening of the pan, and thus connection of the filter assembly, could also be on one of the front, back or side walls. Still further, while the illustrated coupling arrangement between the filter assembly and pan is formed by slidingly cooperating couplers, in some cases threaded couplers might be used, in which case the filter assembly handle could be used to rotate the filter assembly to achieve the desired threaded connection.

Figure 10:
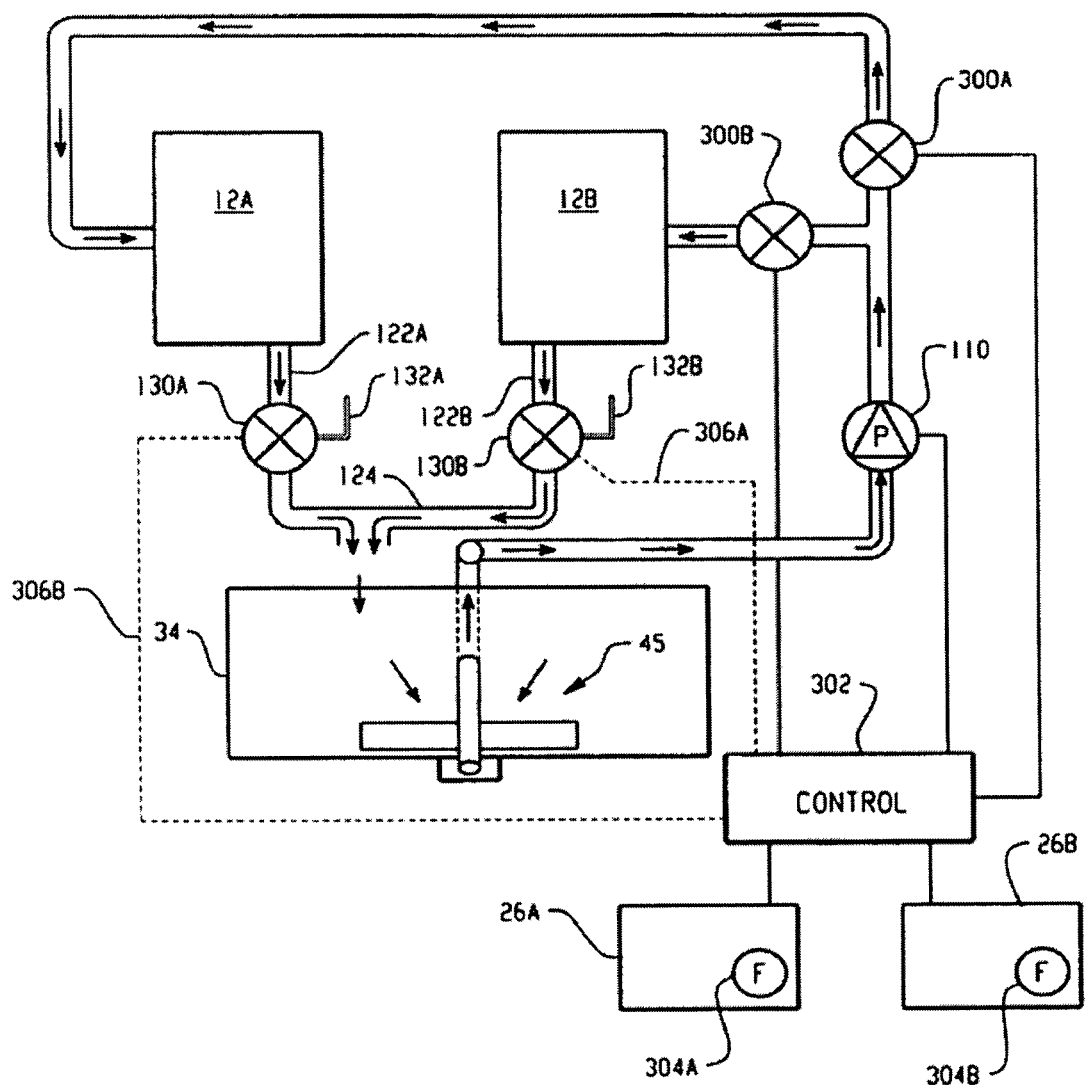
FIG. 10 is a schematic depiction of an alternative fryer oil filtering arrangement.

In the above-described filtration arrangement the flow control devices along the oil drain paths are described, in one embodiment, as being manually operable valves including respective handles for permitting a user to open and close the drain paths as desired, with recognition that automatically controlled flow control devices could also be used. The flow control device of the oil return path for each vat is described, in one embodiment, as being a manually operable valve including a handle. Referring now to the schematic depiction in FIG. 10, where similar components are shown with similar reference characters, in an alternative embodiment of the fryer the manually operated valves 142A, 142B of the return paths are replaced by automatically controlled valves 300A and 300B that do not require the use of a handle. Instead, a control unit 302 is connected to the automated valves 300A and 300B to control the OPEN/CLOSED state of the valves.

In one example, the valves 300A and 300B are normally closed solenoid valves, but other types of automated valves could be used. The control unit 302 is connected for controlling the pumping operations of the pump 110, and also is connected with the control and display panels 26A and 26B. In one embodiment, each control and display panel includes a respective filter input switch 304A and 304B, which in one embodiment may be respective rocker switches.

For a filtering operation of vat 12A, handle 132A is used to manually open valve 130A to permit oil to drain from vat 12A (along the path including 122A and 124) into the pan 34. The user then depresses or otherwise activates the filter input switch 304A, which triggers the control unit 302 to open the valve 300A and turn on the pump 110 so that the oil is filtered (in the same manner described above with respect to FIGS. 1-9). The user manually closes the valve 130A when filtering is complete and it is desired to return all oil to the vat 12A. For a filtering operation of vat 12B, handle 132B is used to manually open valve 130B to permit oil to drain from vat 12B (along the path including 122B and 124) into the pan 34. The user then depresses or otherwise activates the filter input switch 304B, which triggers the control unit 302 to open the valve 300B and turn on the pump 110 so that the oil is filtered. The user manually closes the valve 130B when filtering is complete and it is desired to return all oil to the vat 12B.

In an alternative arrangement, the valves 300A and 300B and pump 110 could be replaced by a first pump at the location of valve 300A and a second pump at the location of valve 300B.

In another arrangement, a single filter input switch could be provided and the control unit 302 could be connected to sense which of valves 130A or 130B is open, with such sensing being used to determine which of valves 300A or 300B to open in response to triggering of the filter input switch.

In an alternative embodiment, the valves 130A and 130B could also be provided as automated valves, with the control unit connected to the respective valves as indicated by dashed lines 306A and 306B. In one such embodiment, for a filtering operation of vat 12A, the user simply depresses or otherwise activates filter input switch 304A and the control unit responsively opens valve 130A, waits a period of time to allow for at least some oil drainage into the pan 34, and then opens the valve 300A and turns on the pump 110 so that the oil is filtered. In another such embodiment, the filter input switch could be eliminated and the control unit could trigger a filtering operation on a timed basis or, for example, each time the fryer is turned off. In one implementation the control unit 302 may automatically run the filtering operation for a set time period before automatically closing the valve 130A in order to refill the vat 12A. In another implementation the control unit 302 may continue the filtering operation until the user depresses or otherwise activates the filter input switch 304A a second time, causing the control unit to responsively close the valve 130A in order to refill the vat 12A. A filtering operation for vat 12B would be similar to that described for vat 12A. In the more fully automated embodiment, an interlock (in the form of a pan closed sensor) could be provided to prevent the valves 130A or 130B from being opened when the drawer/pan 34 is not in the closed position. Where the ability to drain the fryer vats 12A and 12B under no power conditions is considered important, valves 130A and 130B could be combined automated/manual valves or, secondary manual drainage valves could be provided.

While the filter switch or switches 304A and 304B are shown on the control and display panels 26A and 26B, the switches could be located elsewhere on the fryer, including internally of the fryer doors 30A, 30B.

Figure 11:
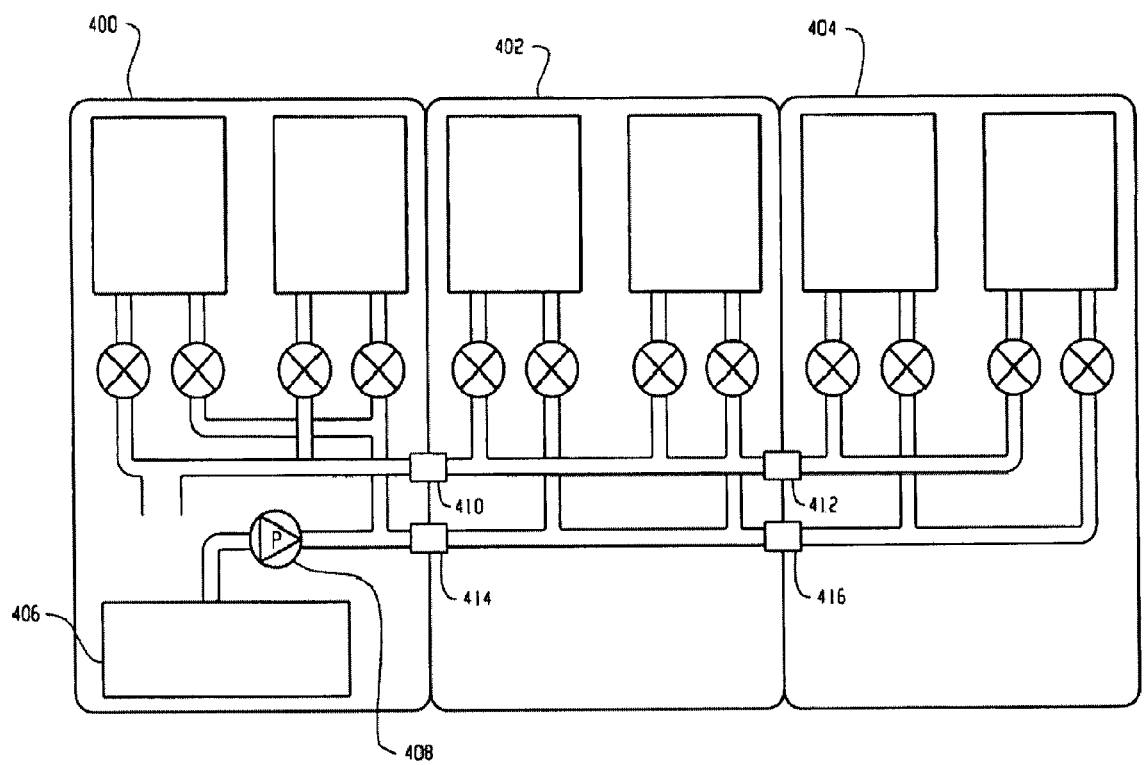
FIG. 11 is another embodiment of a fryer with multiple fryer housings.

Referring to FIG. 11, another embodiment in which multiple fryer housings 400, 402, 404 are connected together is shown, each housing including two fryer vats. Only fryer housing 400 includes a pan 406, associated filter system and pump 408, with drain path piping and return path piping as previously described. The vats of fryer housings 402 and 404 include drain path piping that connects to the drain path piping of fryer housing 400 through couplings 410 and 412. Likewise, the vats of fryer housings 402 and 404 include associated return path piping that connects to the return path piping of fryer housing 400 via couplings 414 and 416. In this arrangement the filter system of fryer housing 400 is capable of filtering the oil of all fryer vats, including the vats of fryer housings 402 and 404, thus eliminating the need for fryer housings 402 and 404 to include the pan and related filter. Appropriate electrical connections between the respective fryer housings are provided to enable, for example, a filter switch on the interface of either fryer housing 402 or 404 to trigger the operation of pump 408. Such control of the pump 408, coupled with the control of the respective drain valves (which may be automated type) and the return path valves (which may be automated type), provides filtering of the oil in any one of the vats of the multiple housing system.

While the filter assembly for the unit of FIG. 11 is shown in the pan in accordance with previously described embodiments, it is recognized that the filter could be located as a replaceable cartridge type filter along the oil return path from the pan (either upstream or downstream from the pump). In such an arrangement the oil return path could include piping positioned with an open end at a location spaced above the bottom wall of the pan (e.g., 'A inch to 2 inches) so that larger solid particles in the oil are collected in and remain in the pan.

Accordingly, the spirit and scope of the invention are to be limited only by the terms of the appended claims.

What is claimed is:

1. A fryer, comprising:
a first fryer vat and a second fryer vat;
a pan for receiving oil drained from the first fryer vat and/or second fryer vat, a filter assembly within the pan for filtering oil;
a first oil drain path leading from an outlet opening of the first fryer vat to the pan;
a second oil drain path leading from an outlet opening of the second fryer vat to the pan;
an oil return path for delivering oil from the pan back to the first and second fryer vats, the oil return path including a common path portion and a first separate portion leading to the first flyer vat and a second separate portion leading to the second fryer vat;
a first automated valve located to control whether flow can occur along the first separate portion of the oil return path back to the first fryer vat, a second automated valve located to control whether flow can occur along the second separate portion of the oil return path back to the second fryer vat;
a control unit connected for controlling a condition of the first automated valve and for controlling a condition of the second automated valve; and
at least one user input device associated with the control unit for triggering the control unit to open either the first automated valve for a filtration operation of the first fryer vat or the second automated valve for a filtration operation of the second fryer vat,
wherein the first oil drain path includes a first manually controlled drain valve and the second oil drain path includes a second manually controlled drain valve, and wherein the control unit is configured to detect the OPEN/CLOSED condition of each of the first manually controlled drain valve and the second manually controlled drain valve, the at least one user input device comprises a single user input device, the control unit responds to the single input device by opening the first automated valve or the second automated valve in accordance with which of the first manually controlled drain valve and the second manually controlled drain valve is open.

2. The fryer of claim 1 wherein a first user input device is provided for triggering the control unit to open the first automated valve and second user input device is provided for triggering the control unit to open the second automated valve.

3. The fryer of claim 1 wherein the first oil drain path includes a first automated drain valve and the second oil drain path included a second automated drain valve, the control unit connected to each for control thereof, the at least one user input device includes a first user input device and a second user input device, activation of the first user input device causes the control unit to open the first automated drain valve and the first automated valve, activation of the second user input device causes the control unit to open the second automated drain valve and the second automated valve.

4. The fryer of claim 3, further including a pump located for delivering oil from the pan back along the oil return path to either the first fryer vat or the second fryer vat, activation of the first user input device also causes the control unit to turn on the pump, activation of the second user input device also causes the control unit to turn on the pump.

5. The fryer of claim 1 wherein the at least one user input device is located on an exterior control panel of the fryer housing.

6. A fryer comprising:
a first fryer vat and a second fryer vat;
a pan for receiving oil drained from the first fryer vat and/or second fryer vat, a filter assembly within the pan for filtering oil;
a first oil drain path leading from an outlet opening of the first fryer vat to the pan;
a second oil drain path leading from an outlet opening of the second fryer vat to the pan;
an oil return path for delivering oil from the pan back to the first and second fryer vats, the oil return path including a common oath portion and a first separate portion leading to the first flyer vat and a second separate portion leading to the second fryer vat;
a first automated valve located to control whether flow can occur along the first separate portion of the oil return path back to the first fryer vat, a second automated valve located to control whether flow can occur along the second separate portion of the oil return path back to the second fryer vat;

a control unit configured to control a condition of the first automated valve and to control a condition of the second automated valve; and
at least one user input device associated with the control unit to trigger the control unit to open either the first automated valve for a filtration operation of the first fryer vat or the second automated valve for a filtration operation of the second fryer vat,
wherein the first fryer vat is within a first fryer housing and the second fryer vat is within a second fryer housing, the pan and filter assembly are located entirely within the first fryer housing.

7. A fryer, comprising:
a first fryer vat and a second fryer vat;
a pan for receiving oil drained from the first fryer vat and/or second fryer vat, a filter assembly within the pan for filtering oil;
a first oil drain path leading from an outlet opening of the first fryer vat to the pan;
a second oil drain path leading from an outlet opening of the second flyer vat to the pan;
an oil return path for delivering oil from the pan back to the first and second fryer vats, the oil return path including a common path portion, a first separate portion leading to the first fryer vat and a second separate portion leading to the second fryer vat;
a first automated flow control device located to control whether flow can occur along the first separate portion of the oil return path back to the first fryer vat, a second automated flow control device located to control whether flow can occur along the second separate portion of the oil return path back to the second fryer vat;
a control unit connected for controlling both the first automated flow control device and the second automated flow control device; and
at least one user input device associated with the control unit for triggering the control unit to operate either the first automated flow control device for a filtration operation of the first fryer vat or the second automated flow control device for a filtration operation of the second fryer vat,
wherein the first automated flow control device is a first pump and the second automated flow control device is a second pump.

8. The fryer system of claim 7 wherein the first automated flow control device is a solenoid valve and the second automated flow control device is a solenoid valve.

9. The fryer of claim 7 wherein the at least one user input device is located on an exterior control panel of the fryer.

* * * * *